US008768755B2

(12) United States Patent
Hedley

(10) Patent No.: US 8,768,755 B2
(45) Date of Patent: *Jul. 1, 2014

(54) ELECTRONIC TOLL MANAGEMENT FOR FLEET VEHICLES

(71) Applicant: Accenture Global Services Limited, Dublin (IE)

(72) Inventor: Jay E. Hedley, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,645

(22) Filed: May 29, 2013

(65) Prior Publication Data

US 2013/0262194 A1     Oct. 3, 2013

Related U.S. Application Data

(63) Continuation of application No. 11/670,307, filed on Feb. 1, 2007.

(60) Provisional application No. 60/744,911, filed on Apr. 14, 2006.

(51) Int. Cl.
*G07B 15/00*     (2011.01)

(52) U.S. Cl.
USPC .......................................................... 705/13

(58) Field of Classification Search
USPC .......................................................... 705/13
See application file for complete search history.

(56) References Cited

U.S. PATENT DOCUMENTS

| 4,242,661 A | 12/1980 | Henoch et al. |
| 4,963,723 A | 10/1990 | Masada |
| 5,349,674 A | 9/1994 | Calvert et al. |
| 5,392,034 A | 2/1995 | Kuwagaki |
| 5,638,302 A | 6/1997 | Gerber |
| 5,740,230 A | 4/1998 | Vaudreuil |
| 5,745,052 A | 4/1998 | Matsuyama et al. |
| 5,819,234 A | 10/1998 | Slavin et al. |
| 5,920,338 A | 7/1999 | Katz |
| 6,042,008 A | 3/2000 | Ando et al. |
| 6,052,068 A | 4/2000 | Price et al. |
| 6,064,318 A | 5/2000 | Kirchner et al. |
| 6,081,206 A | 6/2000 | Kielland |

(Continued)

FOREIGN PATENT DOCUMENTS

| CA | 2163872 A1 | 12/1994 |
| CA | 2422187 A1 | 3/2002 |

(Continued)

OTHER PUBLICATIONS

Canadian Office Action of Application No. 2,516,675, dated Jun. 19, 2008, 4 pages.

(Continued)

*Primary Examiner* — Kira Nguyen
(74) *Attorney, Agent, or Firm* — Fish & Richardson P.C.

(57) ABSTRACT

Toll transaction payment processing includes accessing image data for a vehicle, the image data corresponding to at least one image of the vehicle engaging in a transaction with a toll facility. The image data is processed to determine one or more vehicle identifiers for the vehicle. A fleet vehicle company associated with the vehicle is electronically identified based on the one or more vehicle identifiers. Billing information for the transaction between the vehicle and the toll facility is electronically communicated to the fleet vehicle company.

20 Claims, 8 Drawing Sheets

(56) References Cited

U.S. PATENT DOCUMENTS

| | | | |
|---|---|---|---|
| 6,088,680 | A | 7/2000 | Hoshino et al. |
| 6,121,898 | A | 9/2000 | Moetteli |
| 6,140,941 | A | 10/2000 | Dwyer et al. |
| 6,167,333 | A | 12/2000 | Gehlot |
| 6,538,580 | B2 | 3/2003 | Boström et al. |
| 6,747,687 | B1 | 6/2004 | Alves |
| 6,922,156 | B2 | 7/2005 | Kavner |
| 6,959,869 | B2 | 11/2005 | Tsikos et al. |
| 6,966,489 | B2 | 11/2005 | Grant |
| 6,999,886 | B2 | 2/2006 | Hilliard |
| 7,072,858 | B1 | 7/2006 | Litzow et al. |
| 7,119,674 | B2 | 10/2006 | Sefton |
| 7,407,097 | B2 | 8/2008 | Robinson et al. |
| 2001/0026228 | A1 | 10/2001 | Naito |
| 2002/0072963 | A1 | 6/2002 | Jonge |
| 2002/0097178 | A1 | 7/2002 | Thomas et al. |
| 2002/0105440 | A1 | 8/2002 | Bostrom et al. |
| 2002/0140577 | A1 | 10/2002 | Kavner |
| 2002/0140579 | A1 | 10/2002 | Kavner |
| 2002/0140924 | A1 | 10/2002 | Wangler et al. |
| 2002/0198767 | A1 | 12/2002 | Kim |
| 2003/0011492 | A1 | 1/2003 | Owen et al. |
| 2003/0042304 | A1 | 3/2003 | Knowles et al. |
| 2003/0067396 | A1 | 4/2003 | Hassett |
| 2003/0189500 | A1 | 10/2003 | Lim |
| 2004/0008368 | A1 | 1/2004 | Plunkett et al. |
| 2004/0008514 | A1 | 1/2004 | Lee et al. |
| 2004/0095258 | A1 | 5/2004 | Bosch et al. |
| 2004/0167861 | A1 | 8/2004 | Hedley |
| 2004/0181495 | A1 | 9/2004 | Grush |
| 2005/0197976 | A1 | 9/2005 | Tuton et al. |
| 2006/0056658 | A1 | 3/2006 | Kavner |
| 2006/0064345 | A1 | 3/2006 | Biet |
| 2006/0164258 | A1 | 7/2006 | Garibotto et al. |
| 2006/0258367 | A1 | 11/2006 | Chiang |
| 2007/0124198 | A1 | 5/2007 | Robinson et al. |
| 2007/0252678 | A1 | 11/2007 | Garcia et al. |
| 2007/0299721 | A1 | 12/2007 | Robinson et al. |

FOREIGN PATENT DOCUMENTS

| | | |
|---|---|---|
| DE | 10104502 A1 | 8/2002 |
| GB | 2344205 A | 5/2000 |
| JP | 2004213569 A | 7/2004 |
| WO | WO9814925 A1 | 4/1998 |
| WO | WO9966455 A2 | 12/1999 |
| WO | WO0046068 A1 | 8/2000 |
| WO | WO02063570 A2 | 8/2002 |
| WO | WO03003314 A1 | 1/2003 |
| WO | WO2004042673 A2 | 5/2004 |
| WO | WO2004075121 A1 | 9/2004 |
| WO | WO2007030446 A2 | 3/2007 |

OTHER PUBLICATIONS

Canadian Office Action of Application No. 2,516,675, dated Mar. 31, 2009, 6 pages.

China Office Action of Application No. 200680027002.3 dated Jun. 26, 2009, 10 pages.

Australian Examiner's first report on Australian patent application No. 2004213923.

India First Examination Report for Indian Ref No. 2348/CHENP/2005-CAN dated Jul. 25, 2006.

Hultgren, L. et al., "San Diego's interstate 15 high-occupancy/toll lane facility using value pricing", Institute of Transportation Engineers. ITE Journal, Jun. 1999, vol. 69, issue 6; p. 22, 6 pgs, 18 pages.

International Preliminary Examination Report and Written Opinion for International Application No. PCT/EP2004/001644 dated Sep. 14, 2005.

International Search and Written Opinion, PCT/IB2006/002738, dated Mar. 12, 2007, 11 pages.

International Search Report and Written Opinion for International Application No. PCT IB2006/002435.

McLeod, J., "Automatic highways going the right way?", Electronics, Nov. 28, 1994, 67, 22, 1 page.

Republic of China Office Action of Application No. 200480010404.3 dated Aug. 1, 2008, 27 pages.

Search Report and Written Opinion of Application No. SG200718336-1 dated Sep. 4, 2009, 8 pages.

Search Report and Written Opinion of Application No. SG200718365-0 dated Jul. 23, 2009, 9 pages.

Smith, L. Intelligent Transportation Systems—Electronic Toll Collection [online], Jan. 3, 2002 [retrieved on Jul. 11, 2006]. Retrieved from the Internet<URL: http://www.calccit.org/itsdecision/serv_and_tech/Electronic_toll_collection/electronic_toll_collection_rep_print.html >.

Notification of Transmittal of the International Search Report and the Written Opinion of the International Searching Authority (for PCT/EP2007/003302), dated Jul. 27, 2007, (11 pages).

"Transcore launches Auto Expreso Electronic Toll Collection System for Puerto Rico Highway and Transportaion Authority"; Apr. 26, 2004; 2 pages.

Michael S. James, "Worth the wait? Some Resist Toll-Payment Devices"; Feb. 15, 2005; 5 pages.

Levinson, et al., A model for optimizing electronic toll collection systems, Transportation Research Part A: Policy and Practice 37.4, 2003, pp. 293-314.

800

CYRKUS BANK CHECKING

Checking Account Holder: John P. Smith
Checking Account Number: XXX XXX XXX 12

Account Activity as of: October 31, 2006

810

Pending Transactions -

| | Debit(-) | Credit(+) |
|---|---|---|
| AutomatedToll Payment LIC PLATE # YVA1234; 5:35pm; Dulles, Virginia; Dulles Toll Road; Lane 2A | $2.65 | 815 |

820

Posted Transactions -

| Posting Date | | Debit(-) | Credit(+) |
|---|---|---|---|
| 10/31/06 | Cable Company Bill Payment | $95.25 | |
| 10/31/06 | Telephone Bill Payment | $43.89 | |
| 10/29/06 | Chevy Chase ATM #00000230 Withdrawal Ballston Commons Arlington VA | $120.00 | |
| 10/27/06 | Check 605 | $202.20 | |
| 10/24/06 | AutomatedToll Payment; LIC PLATE # YVA1234; 4:25pm; Dulles, Virginia; Dulles Toll Road; Lane 4A | $2.65 | 825 |
| 10/21/06 | F&R Law Firm, Des=Payroll, ID=XXX12345; EFF DATE: 061021; INDN: Smith, Paul J | | $5100.00 |
| 10/19/06 | SOU Barnes and Gnoble Books #10023454 Purchase SOU BG | | $115.37 |

Page 1 of 3 of Transaction Statement

Fig. 8

ELECTRONIC TOLL MANAGEMENT FOR FLEET VEHICLES

CROSS REFERENCE TO RELATED APPLICATIONS

This application is a continuation (and claims the benefit of priority under 35 USC 120) of U.S. application Ser. No. 11/670,307, filed Feb. 1, 2007, now allowed, which claims priority to U.S. Provisional Application No. 60/744,911, filed Apr. 14, 2006, entitled "Electronic Toll Management for Rental Cars and Fleet Vehicles." Both of these prior applications are incorporated by reference in their entirety.

TECHNICAL FIELD

This document relates to electronic toll management.

BACKGROUND

Transportation facilities such as roads, bridges, and tunnels produce tolls often representing a major source of income for many states and municipalities. The large number of automobiles, trucks, and buses stopping at tollbooths to pay a toll daily can cause significant problems. For example, such facilities may restrict the flow of traffic causing traffic backups and lane changing, often increasing the likelihood of accidents and even more bottlenecks. In addition, many people may be delayed from reaching their destinations, and goods may be delayed from getting to market and millions of gallons of fuel may be wasted as vehicles idle. Environments may experience an increase in pollution as idling and slow moving vehicles emit pollutants (particularly carbon dioxide and carbon monoxide), which may pose a significant health hazard to motorists as well as to tollbooth operators.

Some tollbooth systems may have a program requiring that a motorist rent and then attach to the windshield of the vehicle a radio transponder that communicates via radio frequency with receiver units at tollbooth plazas. However, such programs require drivers to seek out the program and to register for the program. These programs may make it mandatory for a motorist to make a credit card deposit and create an automatic debit account arrangement, which may effectively eliminate drivers with credit problems. These programs also may bill participants based on a minimum amount of travel regardless of the actual amount of travel. Thus, many motorists who travel infrequently travel through the toll road may receive little benefit after investing time and money to participate in the program.

SUMMARY

The present disclosure describes at least one toll system that enables automatic and electronic handling of payment of tolls by vehicles that are associated with a fleet vehicle company. The fleet vehicle company may be a company that uses a group of vehicles to conduct its business, including, for example, a company that coordinates and operates taxicabs, rental cars, sedans, limousines, and delivery trucks. The fleet vehicle company also may include a commercial operation that does not operate and coordinate company vehicles, but rather simply has a financial relationship (e.g., a billing relationship) with a group of customers that also happen to drive. For example, a bank has a financial relationship with a group of customers, each of which has a bank account. The bank, accordingly, has a "virtual fleet" made up of the personal vehicles associated with its existing customers that also drive and that have indicated a desire for automated toll payment services through the bank. Other examples of fleet vehicle companies that have virtual fleets include cell phone companies, Internet service providers, online service providers, and cable television service providers.

The described toll system automatically identifies the vehicles that pass a toll facility as fleet vehicles associated with a previously registered fleet vehicle company by accessing a vehicle identifier database. The vehicle identifier database is regularly updated by the fleet vehicle company to include a set of vehicle identifiers (e.g., license plate numbers) of vehicles for which the fleet vehicle company has agreed to handle toll payment. The updating is accomplished through messages exchanged between a toll computer message server associated with the toll system and a message server associated with the fleet vehicle company.

After determining that a vehicle that transacts or passes through the toll facility is a fleet vehicle associated with a previously registered fleet vehicle company, the toll system populates a data store of the toll computer message server with billing information corresponding to the identified vehicle (i.e., with toll payment billing information). The message server of the fleet vehicle company accesses billing information stored in the data store periodically, or in response to a message from the toll computer message server.

The message server of the fleet vehicle company may, in this manner, retrieve billing information (e.g., toll payment information) for the transacting fleet vehicles in near-real-time. The described toll system thereby enables the fleet vehicle company to integrate toll payment billing information with fleet vehicle bills such that a customer is able to view and pay, for example, a single integrated bill immediately upon returning the fleet vehicle (e.g., if the vehicle is a rental car), immediately upon completing the transaction with the fleet vehicle (e.g., if the vehicle is a taxicab), or when paying the bill associated with the service provided to the customer by the fleet vehicle company (e.g., when paying the cell phone bill or online service provider bill). This integrated bill includes both the toll fees and the fees associated with the customer's transaction with the fleet vehicle company. Additionally or alternatively, the toll payment billing information may be debited in near real-time from the customer's checking or financial services account when the fleet vehicle company is a financial services company (e.g., a bank).

Notably, the described toll system enables vehicles to pay tolls without requiring the vehicles to slow down/stop or to have transponders (e.g., the vehicles may pay tolls while passing the facility at highway speeds—such as, for example, speeds that are 35 mph or faster). Thus, for fleet vehicle companies that employ vehicles for business purposes (e.g., taxicab companies and rental car companies), the toll system saves the fleet vehicle companies the costs of having to purchase one or more transponders for each of their vehicles while still allowing the vehicles to save time/offer better service by enabling the vehicles to pass through toll facilities without stopping. The savings in not purchasing transponders is particularly significant for companies that have vehicles that travel over large geographic distances, since such companies are often forced to purchase multiple transponders due to typical transponders being unable to operate beyond a limited geographic area. Similarly, customers of fleet vehicle companies that do not use vehicles to conduct their business but instead have a virtual fleet consisting of the private vehicles of those existing customers that request automated toll payment are able to provide their customers with the convenience of automated toll payment without requiring the customers to purchase transponders. Moreover, the integrated bill generated by the described toll system offers additional convenience to customers in that customers are now able to conveniently prepay or post-pay toll fees and/or other fleet vehicle fees in a single transaction with the fleet vehicle company.

In one general aspect, toll transaction payment processing includes accessing image data for a vehicle, the image data corresponding to at least one image of the vehicle engaging in a transaction with a toll facility. The image data is processed to determine one or more vehicle identifiers for the vehicle. A fleet vehicle company associated with the vehicle is electronically identified based on the one or more vehicle identifiers. Billing information for the transaction between the vehicle and the toll facility is electronically communicated to the fleet vehicle company.

Implementations may include one or more of the following features. For example, the process may further include capturing the image data. The capturing, accessing, processing, identifying and communicating may occur in near real time in response to the vehicle engaging in the transaction with the toll facility.

The process may further include receiving payment for the transaction between the vehicle and the toll facility through the fleet vehicle company, the payment corresponding to the billing information. Receiving payment for the transaction between the vehicle and the toll facility through the fleet vehicle company may include receiving payment from the fleet vehicle company. The billing information may not include information associated with a vehicle transponder.

Electronically identifying a fleet vehicle company associated with the vehicle based on the one or more vehicle identifiers may include accessing stored vehicle identifiers known to correspond to vehicles associated with the fleet vehicle company, and determining that the one or more vehicle identifiers of the vehicle match one or more of the stored vehicle identifiers that correspond to a vehicle associated with the fleet vehicle company.

The fleet vehicle company may be a company that receives payment from customers for using vehicles to transport the customers or to transport goods for the customers from one geographic location to another. The fleet vehicle company may be a rental car company, a taxicab company, a delivery truck company, a sedan company, or a limousine company.

The fleet vehicle company may be a company that offers services to customers other than transporting customers or goods for customers and that offers automated toll payment services as a supplement to the other offered services. The other offered services may include banking services and/or cell phone services.

The one or more vehicle identifiers may include license plate data. The facility may include at least one of a toll road, a bridge, a tunnel and a parking facility. The vehicle may include a registered vehicle that includes at least one of an automobile, a truck, a motorcycle and a bus.

The transaction may include at least one of a distance traveled by the vehicle through the toll facility, a time period the vehicle is present in the toll facility, the characteristic of the vehicle interacting with the toll facility, and the speed at which the vehicle passes through the toll facility.

In another general aspect, a system includes a database for storing image data for vehicles, the image data corresponding to at least one image of a vehicle engaging in a transaction with a toll facility. The system further includes a computer system configured to access the image data for the vehicle from the database and process the image data to determine one or more vehicle identifiers for the vehicle. The computer system is also configured to electronically identify a fleet vehicle company associated with the first vehicle based on the one or more vehicle identifiers and electronically communicate billing information for the transaction between the first vehicle and the toll facility to the fleet vehicle company.

In another general aspect, an apparatus for transaction payment processing includes a means for accessing image data for a vehicle, the image data corresponding to at least one image of the vehicle engaging in a transaction with a toll facility and a means for processing the image data to determine one or more vehicle identifiers for the vehicle. The apparatus further includes a means for electronically identifying a fleet vehicle company associated with the vehicle based on the one or more vehicle identifiers and a means for electronically communicating billing information for the transaction between the vehicle and the toll facility to the fleet vehicle company.

Implementations may include one or more of the following features. For example, the means for accessing image data for a vehicle may include an image acquisition module having at least one of vehicle sensors, cameras, and digitizing systems. The means for processing the image data to determine one or more vehicle identifiers for the vehicle may include a computer processor configured to perform optical character recognition. The means for electronically identifying a fleet vehicle company associated with the vehicle based on the one or more vehicle identifiers may include a computer processor configured to access a database that associates fleet vehicle company identifiers with vehicle identifiers. The means for electronically communicating billing information for the transaction between the vehicle and the toll facility to the fleet vehicle company may include a message server configured to store the billing information and configured to enable a server associated with the fleet vehicle company to access the billing information.

BRIEF DESCRIPTION OF THE DRAWINGS

FIG. 8 is an exemplary user account statement illustrating including an entry for an automated toll payment transaction.

Like reference symbols in the various drawings indicate like elements.

DETAILED DESCRIPTION

Figure 1:
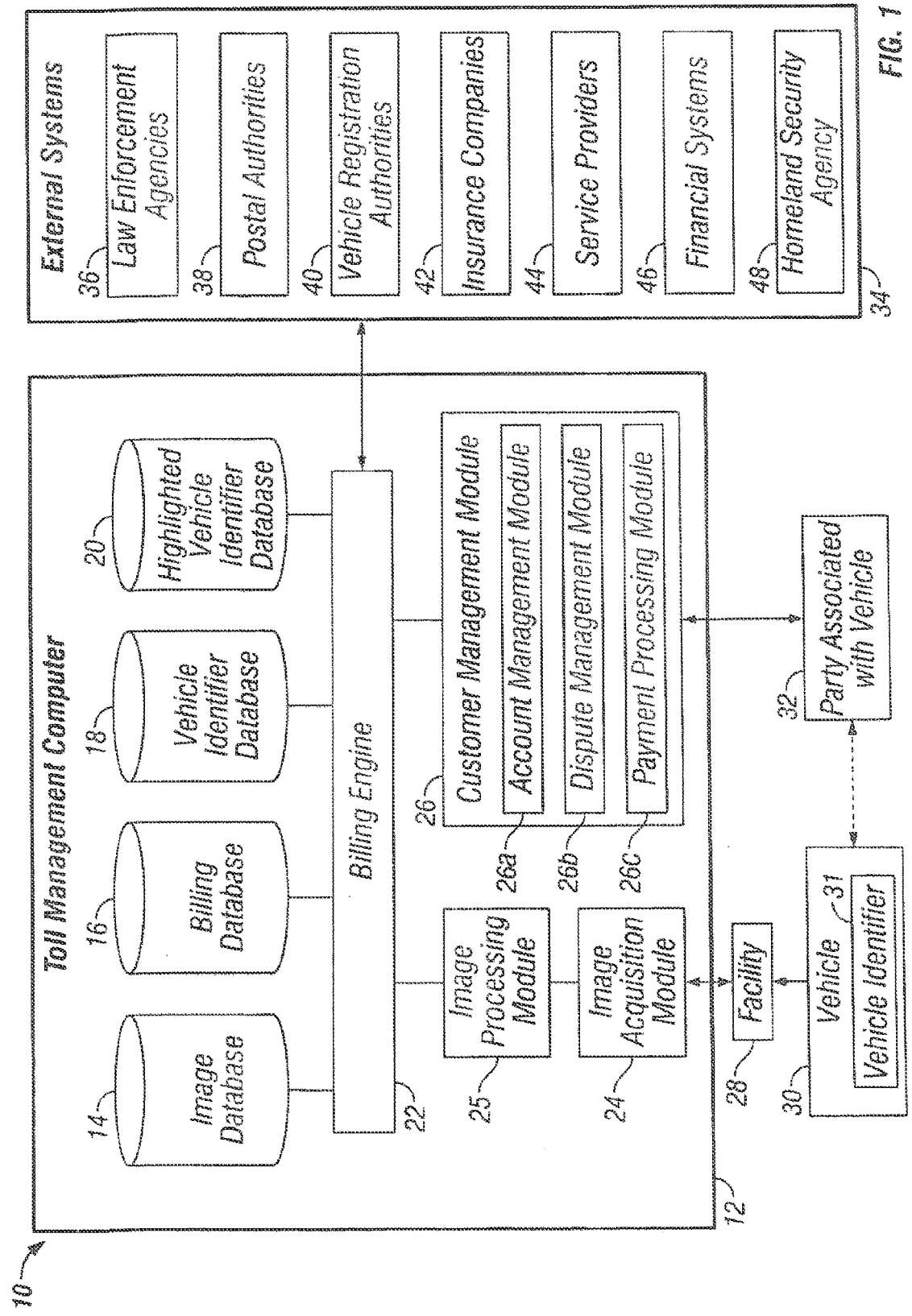
FIG. 1 is a block diagram of an implementation of an electronic toll management system.

FIG. 1 is a block diagram of an implementation of an electronic toll management system 10. The system 10 is configured to capture a vehicle identifier 31 of vehicle 30 interacting with a facility 28 and to notify external systems 34 of such interaction. For example, the system 10 may allow a toll road authority to capture a vehicle identifier 31, such as license plate information, from a vehicle 30 traveling through the toll road and then to notify law enforcement whether the captured vehicle identifier matches a license plate previously highlighted by law enforcement.

The toll management system 10 also can manage payment from a party associated with the vehicle 32 based on the interaction between the vehicle 30 and the facility 28. For example, the system 10 can capture license plate information from a vehicle 30 and identify the registered owner of the vehicle. The system would then provide to the owner, over a communications channel such as the Internet, an account for making payment or disputing payment. The toll management system 10 can send a bill requesting payment from the party 32 using a mailing address that has been verified against one or more mailing address sources. The system 10 is capable of automatically capturing an image of the vehicle 30 triggered by the vehicle interacting with the facility. Such image capturing can be accomplished using image-processing technology without having to install a radio transponder (e.g., RFID device) in a vehicle.

The electronic toll management system 10 includes a toll management computer 12 which can be configured in a distributed or a centralized manner. Although one computer 12 is shown, one or more computers can be configured to implement the disclosed techniques. The computer 12 is coupled to a facility 28 that may charge a fee for interacting with the facility. Examples of a facility 28 include a toll facility (managed by toll authorities) such as toll road, a toll bridge, a tunnel, parking facility, or other facility. The fee may be based on the interaction between the vehicle 30 and the facility 28. Examples of interactions that may involve a fee include a distance traveled by the vehicle through the facility, a time period the vehicle is present in a facility, the type of vehicle interacting with the facility, the speed at which the vehicle passes through the facility, and the type of interaction between the vehicle and the facility.

The facility 28 can process vehicles including automobiles, a truck, buses, or other vehicles. For ease of explanation, the system 10 shows a single facility 28 interacting with a single vehicle 30 and a party associated with the vehicle 32. However, in other implementations, the disclosed techniques could be configured to operate with one or more vehicles interacting with one or more facilities spanning different geographic locations.

The toll management computer 12 includes an image acquisition module 24 configured to detect the presence of a vehicle, acquire one or more images of the vehicle, and forward the image(s) to an image-processing module 25 for further processing. The module 24 may include image acquisition equipment based on the physical environment in which it is used. For example, for open-road applications, image acquisition equipment may be mounted above the roadway, on existing structures or on purpose-built gantries. Some open-road applications may use equipment mounted in or beside the roadway as well. Lane-based (or tollbooth-style) applications may use equipment mounted on physical structures beside each lane, instead of or in addition to equipment mounted overhead or in the roadway.

The image acquisition module 24 may include imaging components such as vehicle sensors, cameras, digitizing systems, or other components. Vehicle sensors can detect the presence of a vehicle and provide a signal that triggers a camera to capture one or more images of the vehicle. Vehicle sensors may include one or more of the following:

(1) Laser/sonic/microwave devices—these devices, commonly used in Intelligent Transportation Systems (ITS) applications, can recognize the presence of a vehicle and provide information regarding the vehicle's size, classification, and/or speed. These sensors may be configured to provide additional information about the vehicle which can be used in identify the vehicle and its use of the toll facility, including trip time and compliance with traffic laws.

(2) Loops—these sensors can detect the presence and the vehicle type by recognizing the presence of metal masses using a wire loop embedded in the road. Loops can be used as a backup to more sophisticated sensors. Loops can also be used as a primary source of data to detect vehicles, classify vehicles, trigger cameras, and provide vehicle signature data (e.g., based on use of an array of loops with a smart loop control program such as Diamond Consulting's IDRIS® system of Buckinghamshire, United Kingdom).

(3) Through-beam sensors—these sensors may emit a continuous beam across the roadway, and detect the presence of a vehicle based upon interruptions in the beam. This type of sensor may be used in installations where traffic is channeled into tollbooth-style lanes.

(4) Optical sensors—vehicle may be recognized using cameras to continuously monitor images of the roadway for changes indicating the presence of a vehicle. These cameras also can be used to record images for vehicle identification.

Cameras can be used to capture images of vehicles and their identifying characteristics. For example, they can be used to generate a vehicle identifier such as a vehicle license number based on an image of a license plate. Cameras may be analog or digital, and may capture one or more images of each vehicle.

Digitizing systems convert images into digital form. If analog cameras are used, the cameras can be connected to separate digitizing hardware. This hardware may include a dedicated processing device for analog-to-digital conversion or may be based on an input device installed in a general-purpose computer, which may perform additional functions such as image processing. Lighting can be employed to provide adequate and consistent conditions for image acquisition. The lighting may include strobes or continuous illumination, and may emit light of light in the visible spectrum or in the infrared spectrum. If strobes are used, they may be triggered by inputs from the vehicle sensor(s). Other sensors such as light sensors may be required to control the image acquisition module 24 and provide consistent results.

Once the image acquisition module 24 has captured images of the vehicles, the images may be forwarded to an image-processing module 25. The image-processing module 25 may be located in the same location as the image acquisition module 24 and the image computer 12, in a remote location, or a combination of these locations. The module 25 can process a single image for each vehicle or multiple images of each vehicle, depending on the functionality of the image acquisition module 24 and/or business requirements (e.g., accuracy, jurisdictional requirements). If multiple images are used, each image may be processed, and the results may be compared or combined to enhance the accuracy of the process. For example, more than one image of a rear license plate, or images of both front and rear license plates, may be processed and the results compared to determine the most likely registration number and/or confidence level. Image processing may include identifying the distinguishing features of a vehicle (e.g., the license plate of a vehicle) within the image, and analyzing those features. Analysis may include optical character recognition (OCR), template matching, or other analysis techniques.

The toll management system 10 may include other systems capable of substantially real-time processing located at the site where images are acquired to reduce data communication requirements. In an implementation of local image processing, the results may be compared to a list of authorized vehicles. If a vehicle is recognized as authorized, images and/or data may be discarded rather than forwarded for further processing.

Images and data can be forwarded to a central processing facility such as the image database 14 operating in conjunction with the billing engine 22. This process may involve a computer network, but may also include physical media from another computer located at the image acquisition site (i.e., facility 28). Generally, information can be temporarily stored on a computer at the image acquisition site in the event the network is unavailable.

Images received at the central site may not have been processed. Any unprocessed images can be handled as described above. The data resulting from image processing (remote or central) may be separated into two categories. Data that meets application-specific or jurisdiction-specific criteria for confidence may be sent directly to the billing engine 22. On the other hand, data results not meeting required confidence levels may be flagged for additional processing. Additional processing may include, for example, determining whether multiple images of a vehicle are available and independently processing the images and comparing the results. This may include character-by-character comparisons of the results of optical character recognition (OCR) on the license plate image. In another example, the image(s) may be processed by one or more specialized algorithms for recognizing license plates of certain types or styles (such as plates from a particular jurisdiction). These algorithms may consider the validity of characters for each position on the license plate, the anticipated effect of certain design features (such as background images), or other style-specific criteria. The processed image may be forwarded based on preliminary processing results, or may include processing by all available algorithms to determine the highest confidence level.

Preliminary data may be compared to other data available to increase the confidence level. Such techniques include:

(1) Comparing OCR processed license plate data against lists of valid license plate numbers within the billing system or at the appropriate jurisdiction's motor vehicle registration authority.

(2) Comparing other data obtained from sensors at the imaging location (such as vehicle size) to known characteristics of the vehicle registered under the registration number recognized by the system, in the recognized jurisdiction or in multiple jurisdictions.

(3) Comparing the registration and other data to records from other sites (e.g., records of the same or similar vehicle using other facilities on the same day, or using the same facility at other times).

(4) Comparing vehicle fingerprint data against stored lists of vehicle fingerprint data. The use of vehicle fingerprint data for vehicle identification is described in more detail below.

(5) Manually viewing the images or data to confirm or override the results of automated processing.

If additional processing provides a result with a particular confidence level, the resulting data then can be forwarded to the billing engine 22. If the required confidence level cannot be attained, the data may be kept for future reference or discarded.

The billing engine 22 processes the information captured during the interaction between the vehicle and the toll facility, including the vehicle identifier as determined by the image processing module 25 to create a transaction event corresponding to an interaction between the vehicle and the facility. The engine 22 can store the transaction event in a billing database 16 for subsequent payment processing. For example, the billing engine 22, alone or in combination with a customer management module 26 (described below), produces payment requests based on the transaction events. The transaction event data may include individual charges based on a vehicle's presence at specific points or facilities, or trip charges based on a vehicle's origin and destination involving a facility. These transaction events can be compiled and billed, for example, by one or more of the following methods:

(1) Deducting payment from an account established by the vehicle owner or operator. For example, the billing database 20 can be used to store an account record for each vehicle owner. In turn, each account record can include a reference to one more transaction events. A paper or electronic payment statement may be issued and sent to the registered owner of the vehicle.

(2) Generating a paper bill and sending it to the owner of the vehicle using a mailing address derived from a vehicle registration record.

(3) Presenting an electronic bill to a predefined account for the vehicle owner, hosted either by the computer 12 or a third party.

(4) Submitting a bill to the appropriate vehicle registration authority or tax authority, permitting payment to be collected during the vehicle registration renewal process or during the tax collection process.

Billing may occur at regular intervals, or when transactions meet a certain threshold, such as maximum interval of time or maximum dollar amount of outstanding toll charges and other fees. Owners may be able to aggregate billing for multiple vehicles by establishing an account with the computer 12.

The customer management module 26 can allow a user to interact with the toll management computer 12 over a communications channel such as a computer network (e.g., Internet, wired, wireless, etc.), a telephone connection, or other channel. The user can include a party associated with a vehicle 22 (e.g., owner of the vehicle), a public or private authority responsible for management of the facility 28, or other user. The customer management module 26 includes a combination of hardware and software module configured to handle customer interactions such as an account management module 26a, a dispute management module 26b and a payment processing module 26c. The module 26 employs secure access techniques such as encryption, firewalls, password or other techniques.

The account management module 26a allows users such as motorists to create an account with the system 10, associate multiple vehicles with that account, view transactions for the account, view images associated with those transactions, and make payments on the account. In one implementation, a user responsible for the facility can access billing and collection information associated with motorists that have used the facility.

The dispute management module 26b may permit customers to dispute specific transactions on their accounts and to resolve disputes using the computer 12 or third parties. Disputes may arise during billing situations. The module 26b may help resolve such disputes in an automated fashion. The module 26b can provide a customer to access an "eResolution" section of a controlling/billing authority website. Customers can file a dispute and download an image of their transaction, the one in question. If there is no match (i.e., the customers automobile is not the automobile in the photo frame), the bill can be forwarded for a third party evaluation such as arbitration. In the far more likely case, the photo will show that the customer's automobile was indeed billed correctly. Dispute management can use encrypted security in which all text and images are sent over a computer network (e.g., the Internet) using high strength encryption. Proof of presence images can be embedded into the dispute resolution communication as an electronic watermark.

The payment processing module 26c provides functionality for processing payments manually or electronically, depending on the remittance received. For example, if payment remittance is in the form of a paper check, then scanning devices could be used to convert the paper information into electronic format for further processing. On the other hand if electronic payment is employed, then standard electronic payment techniques can be used. The payment processing module 26c can support billing methods such as traditional mailing, electronic payment (e.g. using a credit card, debit card, smart card, or Automated Clearing House transaction), periodic billing (e.g., send the bill monthly, quarterly, upon reaching a threshold, or other). The payment processing module 26c can support discounts and surcharges based on frequency of usage, method of payment, or time of facility usage. The payment processing module 26c also can support payment collection methods such as traditional check processing, processing payment during renewal of a vehicle registration (with interest accrued), electronic payment, direct debit bank, credit cards, pre-payment, customer-initiated payments (as often as the customer desires), or provide discounts for different purposes.

The toll management computer 12 communicates with external systems 34 using one or more communications techniques compatible with the communications interfaces of the systems. For example, communications interfaces can include computer networks such as the Internet, electronic data interchange (EDI), batch data file transfers, messaging systems, or other interfaces. In one implementation, external systems 34 include law enforcement agencies 36, postal authorities 38, vehicle registration authorities 40, insurance companies 42, service providers 44, financial systems 46 and a homeland security agency 48. The external systems 34 can involve private or public organizations that span one or more geographic locations such as states, regions, countries, or other geographic locations.

The toll management computer 12 can interface and exchange information with law enforcement agencies 36. For example, as vehicles are identified, the computer can submit substantially real-time transactions to law enforcement systems, in formats defined by the law enforcement agencies. Transactions also can be submitted for vehicles carrying hazardous materials or violating traffic regulations (e.g. speeding, weight violations, missing plates), if the appropriate sensors are in place (e.g. laser/sonic/microwave detectors as described above, weight sensors, radiation detectors). Alternatively, vehicle records can be compiled and forwarded in batches, based on lists provided by law enforcement agencies.

The highlighted vehicle identifier database 20 can be used to store the lists provided by the law enforcement agencies. The term "highlighted" refers to the notion that the law enforcement agencies have provided a list of vehicle identifiers that the agencies have indicated (highlighted) they wish the toll facility to monitor. For example, when a motor vehicle is stolen and reported to police, the police can send a list of highlighted vehicle identifiers to the database 20. When the vehicle highlighted by the police travels through facility, the imaging processing module 24 determines a vehicle identifier associated with the vehicle and determines through certain interfaces that the particular vehicle is being sought by law enforcement. The law enforcement authorities may wish to be instantly notified of the location of the vehicle (and driver), the time it was detected at the location, and the direction it was headed. The computer 12 can notify in substantially real-time mobile units associated with law enforcement. In addition, law enforcement can automatically highlight vehicles based upon the expiration of a license, occurrence of a traffic court date, or other event. This could, in turn, help keep illegal drivers off the road and increase revenue to the state.

The toll management computer 12 can interface and exchange information with postal authorities 38. Since the disclosed techniques would require toll authorities to convert from receiving payment by drivers at the time of travel to receiving paying in arrears, it is important that bills be sent to the correct driver/vehicle owner. To minimize the possibility of sending the bill to the wrong person, the computer 12 supports address reconciliation. For example, before a bill is mailed, the computer 12 verifies that the address provided by a motor vehicle department matches the address provided by the postal authority. The motor vehicle database can then be updated with the most accurate address information related to the vehicle owner. Since this occurs before the bill is mailed, billing errors can be reduced.

The toll management computer 12 can interface and exchange information with vehicle registration authorities 40. The registration authorities 40 provide an interface to exchange information related to the owners of vehicles, the owners' addresses, characteristics of the vehicles, or other information. Alternatively, this information can be accessed through third-party data providers rather than through an interface to public motor vehicle records. The accuracy of records in the various databases used by the computer 12, including vehicle ownership and owner addresses, may be verified periodically against third-party databases or government records, including motor vehicle records and address records. This may help ensure the quality of ownership and address records, and reduce billing errors and returned correspondence.

The toll management computer 12 can interface and exchange information with insurance companies 42. Insurance companies could highlight vehicle identifiers in a manner similar to law enforcement authorities 36. For example, the highlighted vehicle identifiers database 20 can include license plate numbers of vehicles with an expired insurance indicating that such drives would be driving illegally. The computer could notify law enforcement as well as insurance companies whether the highlighted vehicle has been detected using a particular facility.

The toll management computer 12 can interface and exchange service providers 44. For example, the computer 12 can support batch or real-time interfaces for forwarding billing and payment collection functions to billing service providers or collection agencies.

The toll management computer 12 can interface and exchange information with financial systems 46. For example, to handle bill payment and collection, the computer 12 can interface to credit card processors, banks, and third-party electronic bill presentment systems. The computer 12 can also exchange information with accounting systems.

The toll management computer 12 can interface and exchange information with the homeland security agency 48. The office of homeland security can automatically provide a list of individuals for use in the highlighted vehicle identifier database 20. For example, registered drivers that are on a visa to this country can be automatically highlighted when that visa expires. The computer 12 would then notify the office of homeland security 48 that the highlighted vehicle identifier associated with the person has been detected driving in the country including the time and location information about the vehicle.

As described above, data captured from the toll site flows into the image database, and is retrieved from the image database by the billing engine. In another implementation, the toll computer detects, for each vehicle, an interaction between the vehicle and a toll facility, captures images and generates a data record. The data record can include date, time, and location of transaction, a reference to the image file, and any other data available from the sensors at the facility (e.g., speed, size). The image can be passed to the image-processing module 25, which can generate a vehicle identifier, a state, and a confidence factor for each vehicle.

This information can be added to the data record. (This process my occur after transmission to the central facility.) The data record and image file can be sent to the central facility. The image can be stored in the image database, and referenced if (a) additional processing is required to identify the vehicle, or (b) someone wishes to verify the transaction. If the confidence level is adequate, the data record can be submitted to the billing engine, which can associate it with an account and store it in the billing database for later billing. If no account exists, the vehicle identifier is submitted to the appropriate state registration authority or a third-party service provider to determine the owner and establish an account. This process may be delayed until enough transactions are collected for the vehicle to justify issuing a bill. If confidence level is not adequate, additional processing may be performed as described elsewhere.

The techniques described above describe the flow of data based on a single transaction end-to-end, then looping back to the beginning. In another implementation, some of the functions described may be event-driven or scheduled, and may operate independently of one another. For example, there may be no flow of control from back-end processes to vehicle imaging. The imaging process may be initiated by an event, including the presence of a vehicle at the toll site.

In another implementation, the system may be used to monitor traffic and manage incidents. For example, if a drop in average vehicle speed is detected, the computer can send a message to a highway control facility alerting controllers to the possibility of an incident. Authorized controllers may communicate with the equipment at the toll site to view images from the cameras and determine if a response is required.

The operation of the toll management system 10 is explained with reference to FIGS. 2-5.

Figure 2:
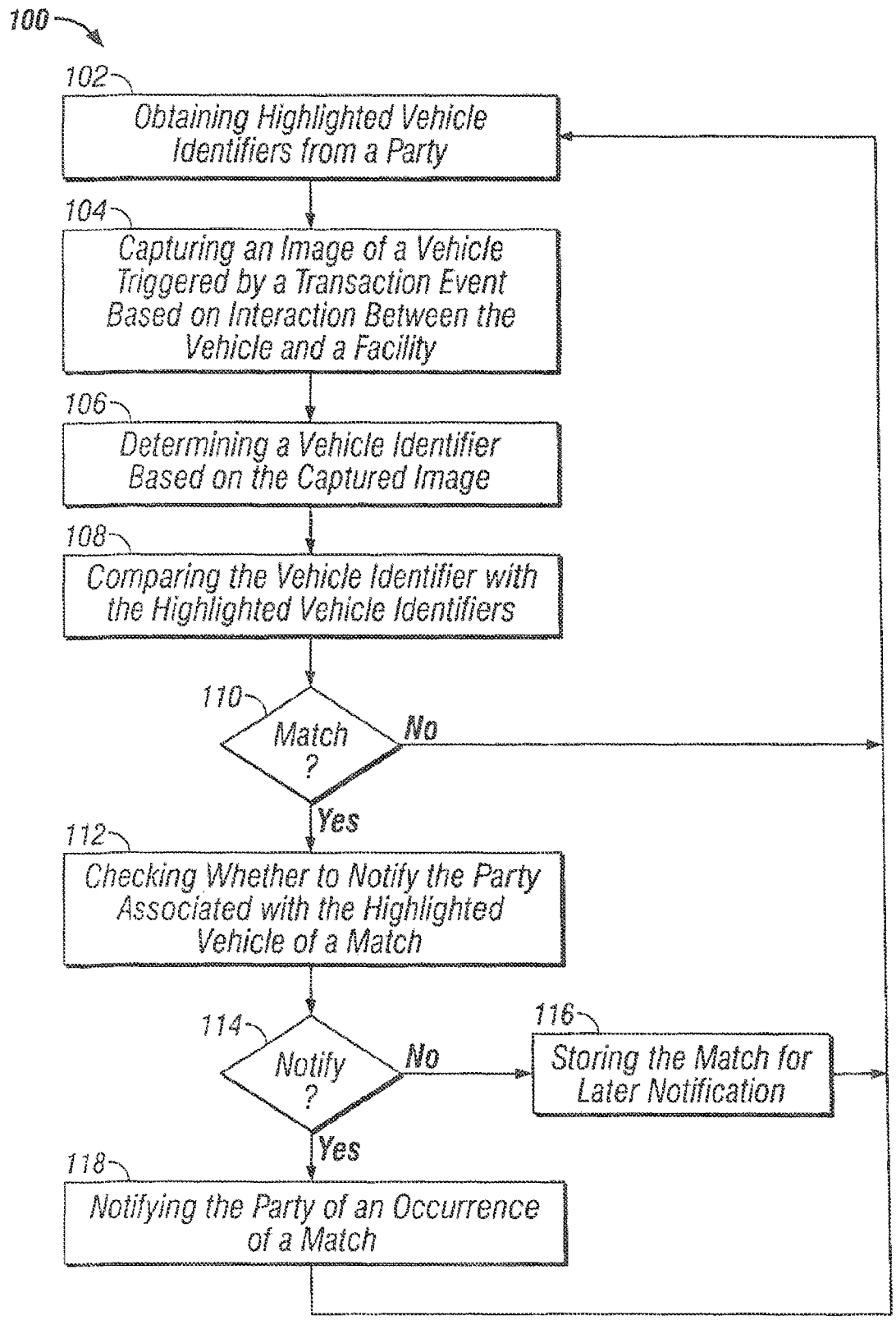
FIG. 2 is a flow chart of an implementation of an electronic toll management system related to highlighted vehicle identifier management.

FIG. 2 is a flow chart of an implementation of electronic toll management system related, particularly a process 100 for managing highlighted vehicle identifiers 20 provided by external systems 34. To illustrate, in one example, it is assumed that law enforcement agencies 36 generate a list of highlighted vehicle identifiers (e.g., license plate numbers) of drivers being sought by the agencies and that the agencies 36 wish to be notified when such vehicles have been identified using a toll facility 28.

The computer 12 obtains (block 102) highlighted vehicle identifiers from a party such as law enforcement agencies 36. In one implementation, these vehicle identifiers can be stored in the vehicle identifier database 20 for subsequent processing. The database 20 can be updated by the agencies with new as well as additional information in real-time and/or in batch mode. The law enforcement agencies accessed by the computer span across multiple jurisdictions such as cities, municipalities, states, regions, countries or other geographic designations. As a result, the computer 12 can process vehicle information across multiple jurisdictions and on a national scale.

The computer 12 captures (block 104) an image of a vehicle triggered by a transaction event based on an interaction between the vehicle 30 and the facility 28. For example, the image acquisition module 24 can be used to acquire one or more images of a vehicle as it travels through a facility such as a toll road. These images can be stored in the image database 14 for further processing by the image-processing module 25. Compression techniques can be applied to the captured images to help reduce the size of the database 14.

The computer 12 determines (block 106) a vehicle identifier based on the captured image. For example, as discussed previously, the image-processing module 25 can apply image analysis techniques to the raw images in the image database 14. These analysis techniques can extract a license number from one or more images of a license plate of the vehicle. The extracted vehicle identifiers can be stored in the vehicle identifier database 18 for further processing.

The computer 12 compares (block 108) a captured vehicle identifier with the highlighted vehicle identifier. For example, the computer 12 can compare a captured license plate number from the vehicle identifier database 18 with a license number from the highlighted vehicle identifier database 20. As discussed above, automatic as well as manual techniques can be applied to check for a match.

If the computer 12 detects a match (block 110) between the license numbers, then it checks (block 112) how the party associated with the highlighted vehicle identifiers wishes to be notified. This information can be stored in the vehicle identifier database 20 or other storage mechanism. On the other hand, if there is no match, the computer 12 resumes executing the process 100 beginning at block 102.

If the party indicates that it wishes to be notified immediately (block 114), then the computer notifies (block 118) the party upon the occurrence of a match. In this example, the computer can notify law enforcement of the match in substantially real-time using wireless communications techniques or over a computer network.

On the other hand, if the party does not wish to be notified immediately (block 114), then the computer 12 stores (block 116) the match for later notification upon satisfaction of pre-defined criteria. In one implementation, predefined criteria can include gathering a predefined number of matches and then sending the matches to law enforcement in batch mode.

Once the party has been notified (block 118) of a match or the match has been stored for later notification (block 116), the computer 12 resumes executing process 100 beginning at block 102.

Figure 3:
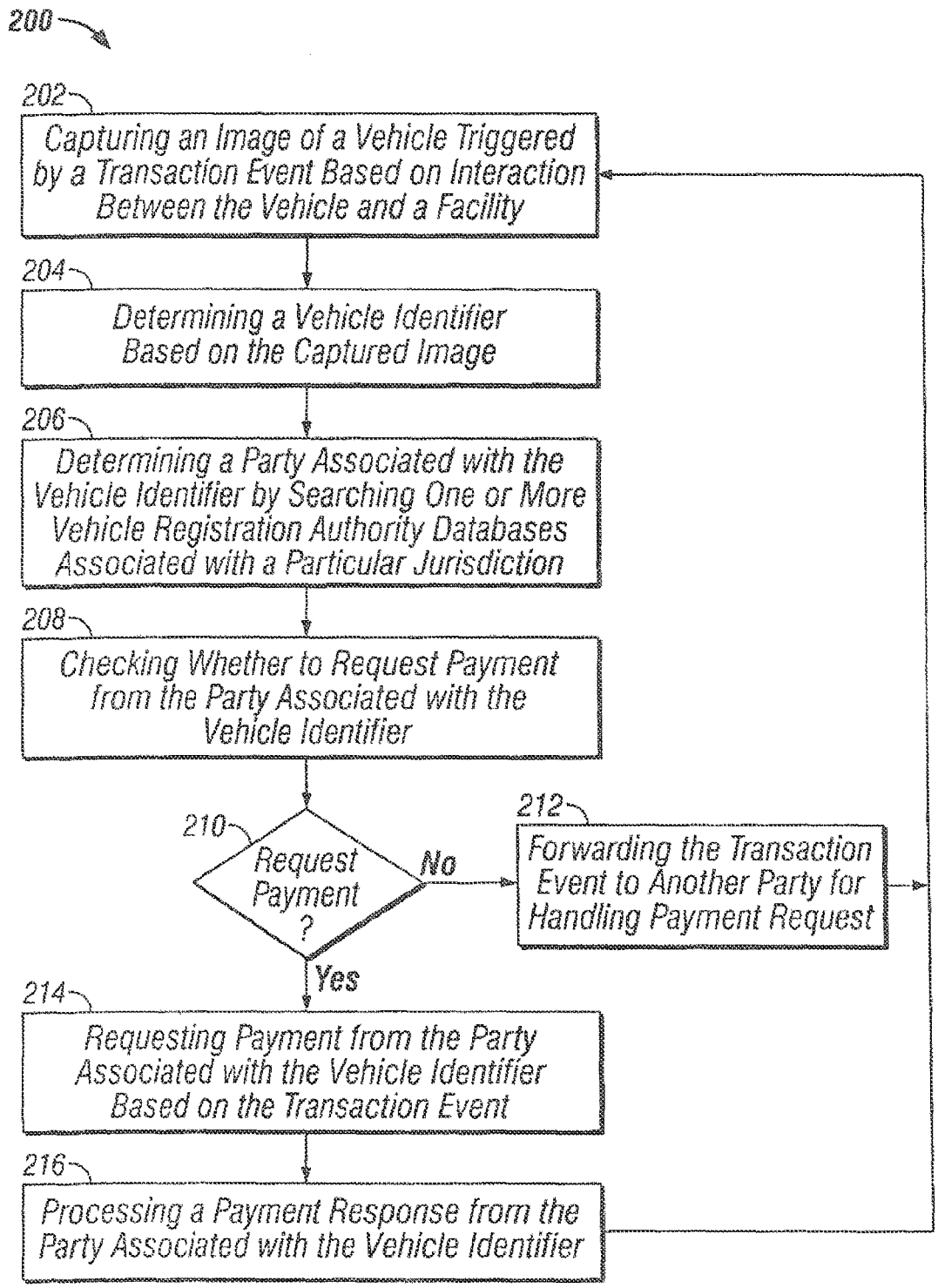
FIG. 3 is a flow chart of an implementation of an electronic toll management system related to payment management.

FIG. 3 is a flow chart of an implementation of electronic toll management system 10, particularly a process 200 for managing payment from a party associated with a vehicle that has interacted with a facility. To illustrate, in one example, it is assumed that a toll road authority decides to employ the disclosed techniques to handle payment processing including billing and collecting tolls from vehicles using its toll road.

The computer 12 captures (block 202) an image of a vehicle triggered by a transaction event based on an interaction between the vehicle and a facility. This function is similar to the process discussed above in reference to block 104 of FIG. 2. For example, the image acquisition module 24 can be used to acquire one or more images of a vehicle 30 as it travels through the toll road 28. These images can be stored in the image database 14 for further processing by the image-processing module 25.

The computer 12 determines (block 204) a vehicle identifier based on the captured image. This function is also similar to the process discussed above in reference to block 106 of FIG. 2. For example, the image-processing module 25 can be used to extract a license number from one or more images of a license plate of the vehicle. These vehicle identifiers can be stored in the vehicle identifier database 18 for further processing.

The computer 12 determines (block 206) a party associated with the vehicle identifier by searching a registration authority databases. For example, the computer 12 can use the vehicle identifier from the vehicle identifier database 18 to search a database of a vehicle registration authority 40 to determine the registered owner of the vehicle associated with the vehicle identifier. The computer 12 is capable of accessing vehicle information from one or more vehicle registration databases across multiple jurisdictions such as cities, municipalities, states, regions, countries or other geographic locations. In one implementation, the computer 12 can maintain a copy of registration information from multiple registration authorities for subsequent processing. Alternatively, the computer 12 can access multiple registration authorities and obtain registration information on a demand basis. In either case, these techniques allow the computer 12 to process vehicle information across multiple jurisdictions, and thus process vehicles on a national scale.

The computer 12 checks (block 208) whether to request payment from the party associated with the vehicle identifier.

The request for payment can depend on payment processing information associated with the registered owner. For example, the registered owner may be sent a bill based on a periodic basis (e.g., monthly basis), when a predefined amount has been reached, or other arrangement.

If the computer 12 determines that payment is required (block 210), then it requests (block 214) payment from the party associated with the vehicle identifier based on the transaction event. As discussed above, a request for payment can be generated using traditional mail service techniques or electronic techniques such as electronic payment. The amount of the bill can depend on information from the transaction event such as the nature of the interaction between the vehicle and the facility. For example, the transaction event can indicate that the vehicle traveled a particular distance defined as a distance between a starting and ending point on the toll road. Accordingly, the amount of the payment requested from the registered owner can be based on the distance traveled.

On the other hand, if the computer 12 determines that payment is not required (block 210), then it forwards (block 212) the transaction event to another party to handle the payment request. For example, the toll authority may have decided that the computer 12 can handle image processing functions and that toll billing and collection should be handled by a third party such as external systems 34. In one implementation, the computer 12 can interface with service providers 44 and financial systems 48 to handle all or part of the billing and payment-processing functionality. Once the transaction event has been forwarded to a third party, the computer 12 resumes executing the functions of process 200 beginning at block 202.

If the computer handles payment processing, the computer 12 processes (block 216) a payment response from the party associated with the vehicle identifier. In one implementation, the billing database 16, in conjunction with the billing engine 22 and the customer management module 26, can be used to handle billing and collection functions. As discussed above, the payment processing module 26c can support electronic or manual payment processing depending on the remittance received. For example, the computer 12 can provide an account for handling electronic payment processing over a computer network such as the Internet. The computer can also handle traditional payment receipt such as a check.

Once a payment has been processed (block 216), the computer 12 resumes executing process 200 beginning at block 202.

Figure 4:
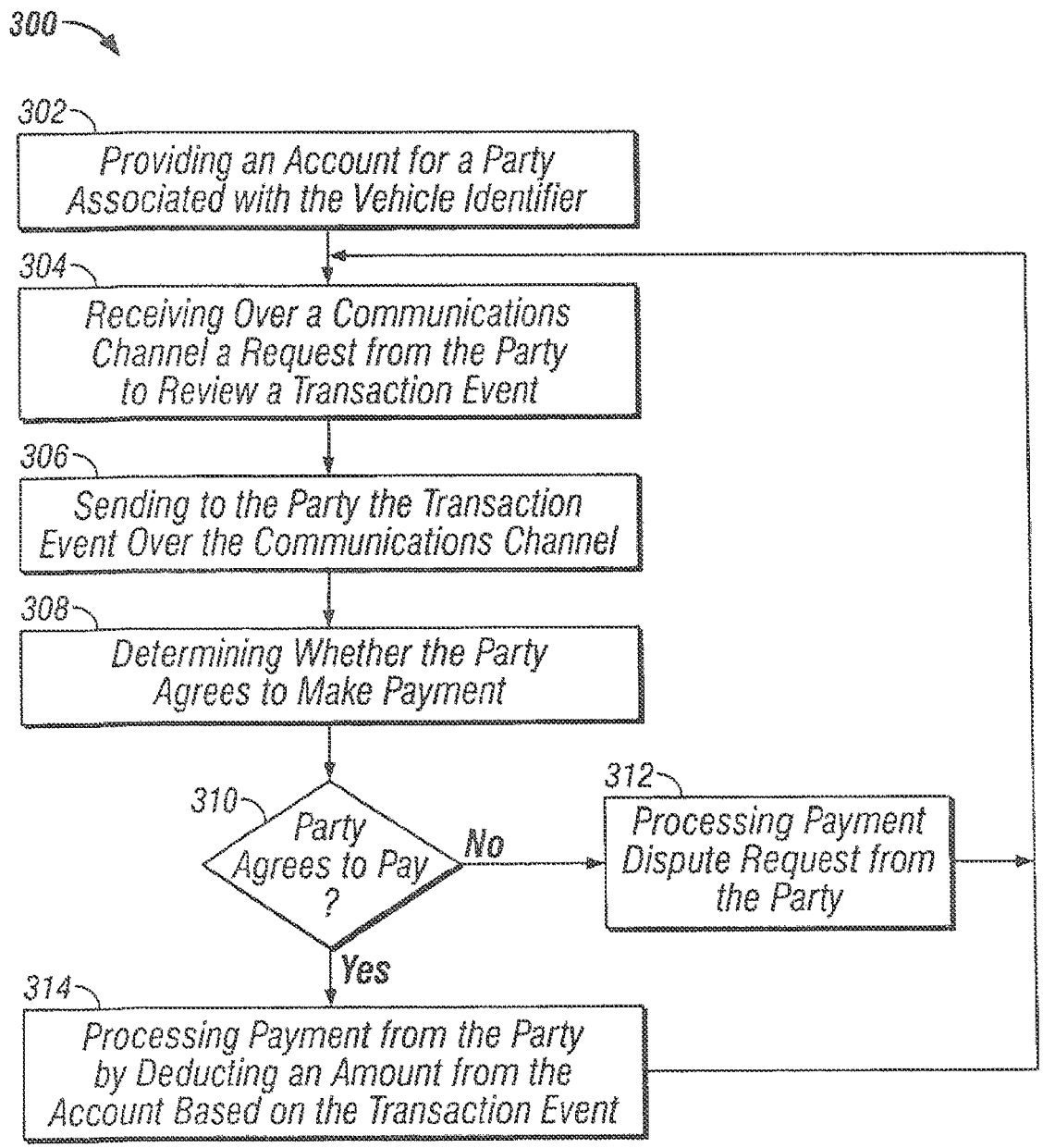
FIG. 4 is a flow chart of an implementation of an electronic toll management system related to payment management.

FIG. 4 is a flow chart of an implementation of electronic toll management system 10, particularly process 300 for managing payment over a communications channel from a party associated with a vehicle that has interacted with a facility. To illustrate, assume a toll authority responsible for a toll road employs the disclosed techniques and that a registered owner wishes to efficiently and automatically make payments for using the toll road.

The computer 12 provides (block 302) an account for a party associated with the vehicle identifier. In one embodiment, the computer 12 in conjunction with the account management module 26a can provide a website for customers to open an account for making electronic payment over a computer network such as the Internet. The website also can permit the customer to access and update account information such as payment history, payment amount due, preferred payment method, or other information.

The computer 12 receives (block 304) a request over a communications channel from the party to review a transaction event. For example, the account payment module 26a can handle this request by retrieving transaction event information associated with the customer's account from the billing database 16. The retrieved information can include image data of a particular transaction involving the customer's vehicle and the tollbooth.

The computer 12 sends (block 306) the transaction event to the party 32 over the communications channel. Information related to the transaction event can include images of the vehicle and the vehicle identifier (i.e., license plate). Such data can be encrypted to permit secure transmission over the Internet. Standard communications protocols such as hypertext markup language (HTML) can be used to transmit the information over the Internet.

The computer 12 determines (block 308) whether the party agrees to make payment. For example, once the customer receives the information related to the transaction event, the customer can review the information to determine whether to make payment based on whether the vehicle shown in the images is the customer's vehicle.

If the computer 12 determines (block 310) that the party agrees to pay, then it processes (block 314) payment from the party by deducting an amount from the account based on the transaction event. For example, if the image information indicates that the transaction event data is accurate, then the customer can authorize payment such as by submitting an electronic payment transaction.

On the other hand, if the computer 12 determines (block 310) that the party does not agrees to pay, then the computer 12 processes (block 312) a payment dispute request from the party. In one implementation, the dispute management module 26b can handle a dispute request submitted by the customer using online techniques. The module 26b can handle specific transactions related to the customer's account including involving a third party to resolve the dispute.

Once a payment has been processed (block 314) or a dispute resolved (block 312), the computer 12 resumes executing process 300 beginning at block 304.

Figure 5:
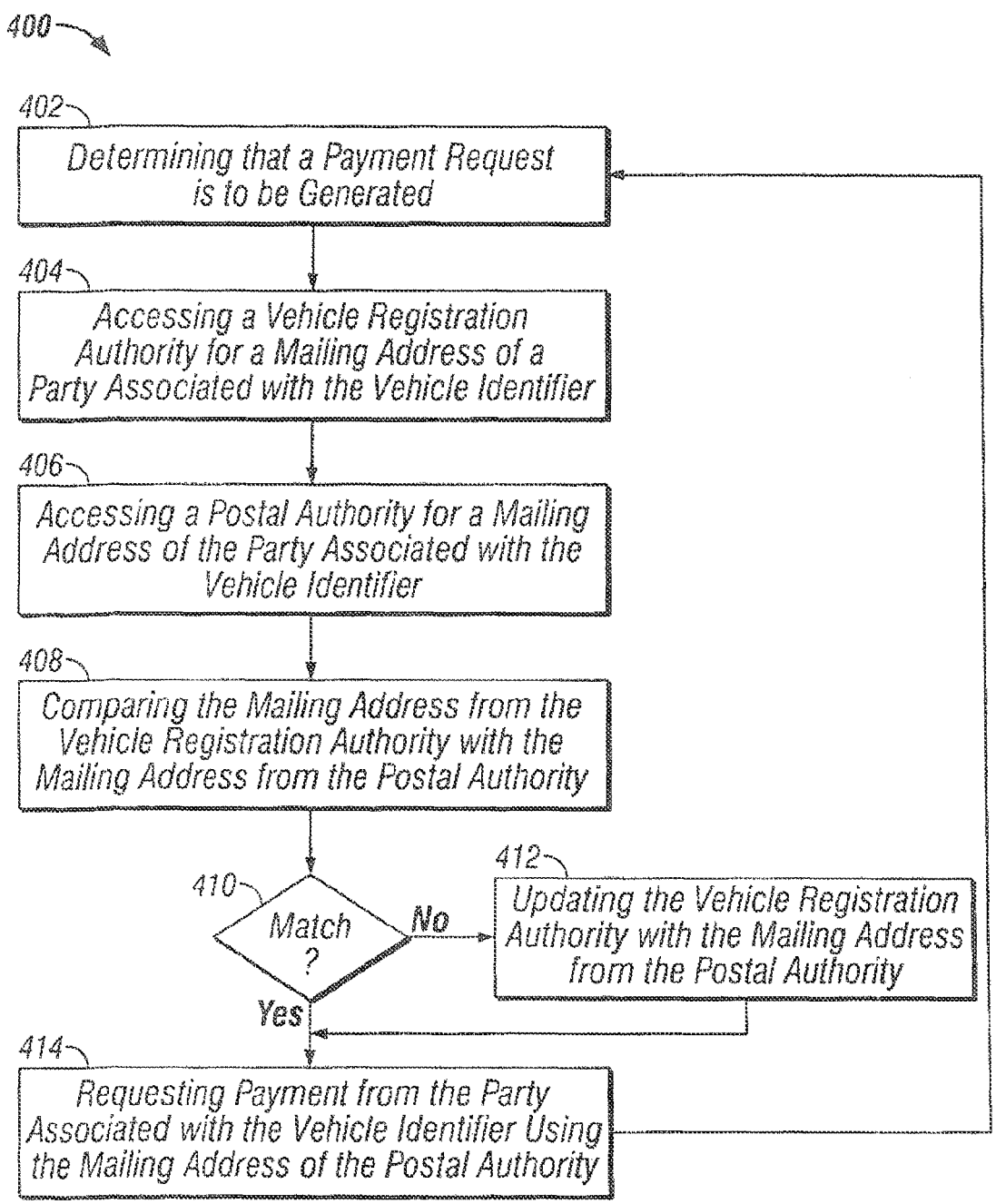
FIG. 5 is a flow chart of an implementation of an electronic toll management system related to mailing address verification.

FIG. 5 is a flow chart of an implementation of electronic toll management system, particularly a process 400 for reconciling mailing addresses from different sources. To illustrate, it is assumed that a toll authority has decided to employ the disclosed techniques for processing payment related to the use of toll facility. Since the disclosed techniques involve processing payment some time after the vehicle has traveled through the toll authority, these techniques help ensure that payment is sent to the correct address of the registered owner of the vehicle.

The computer 12 determines (block 402) that a payment request is to be sent to a party associated with a vehicle identifier. As explained above, for example, payment requests may be generated based on a periodic basis or on an amount threshold basis.

The computer 12 accesses (block 404) a vehicle registration authority for a mailing address of a party associated with the vehicle identifier. For example, the computer 12 may access one or more databases associated with vehicle registration authorities 40 to retrieve information such as the mailing address of the registered owner of the vehicle.

The computer 12 accesses (block 406) a postal authority for a mailing address of the party associated with the vehicle identifier. For example, the computer 12 may access one or more databases associated with postal authorities 38 to retrieve information such as the mailing address of the registered owner of the vehicle.

The computer 12 compares (block 408) the mailing address from the vehicle registration authority with the mailing address from the postal authority. For example, the computer compares the mailing addresses from the two authorities to determine if there is a discrepancy between the database information.

If the computer 12 determines (block 410) that the addresses match, then it requests (block 414) payment from the party associated with the vehicle identifier using the mailing address accessed from the postal authority. For example, the computer 12 can use the techniques discussed above to handle payment processing including billing and collecting payment from the registered owner.

On the other hand, if the computer 12 determines (block 410) that the addresses do not match, it then updates (block 412) the vehicle registration authority with the mailing address from the postal authority. For example, the computer 12 can update databases associated with vehicle registration authorities 40 with the correct mailing address retrieved from the postal authorities 38. Such techniques may help reduce the likelihood of mailing a bill to an incorrect mailing address resulting in a reduced time for payment remittance.

Once the vehicle registration authority has been updated (block 412) or payment requested (block 414), the computer 12 executes process 400 beginning at block 402 as explained above.

Figure 6:
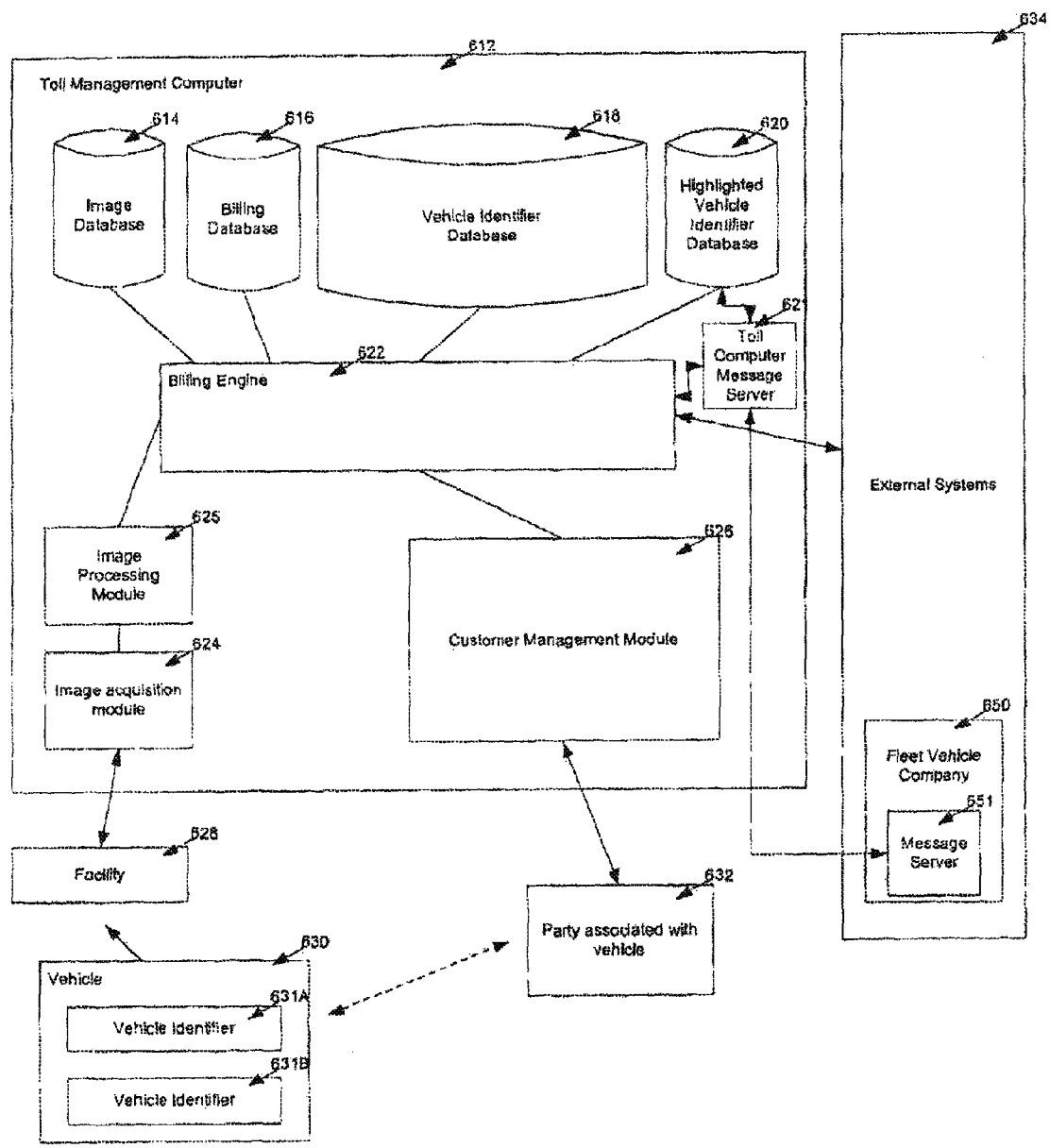
FIG. 6 is a block diagram of an implementation of an electronic toll management system.

FIG. 6 is a block diagram of an implementation of an electronic toll management system 600 that provides automated toll payment for vehicles associated with a rental car or fleet vehicle company. The toll management system 600 includes a toll management computer 612. The toll management computer includes an image database 614, a billing database 616, a vehicle identification database 618, a highlighted vehicle identifier database 620, a billing engine 622, an image acquisition module 624, an image processing module 625, and a customer management module 626. The toll management computer 612 communicates with or is integrated with a toll facility 628, which interacts with a vehicle 630 and a party associated with the vehicle 632. The toll management computer 612 also communicates with external systems 634 which may be similar to the external systems 34 described herein.

Examples of each element within the toll management system 600 of FIG. 6 are described broadly above with respect to FIG. 1. In particular, the toll management computer 612, the image database 614, the billing database 616, the vehicle identification database 618, the highlighted vehicle identifier database 620, the billing engine 622, the image acquisition module 624, the image processing module 625, the customer management module 626, and the toll facility 628 typically have attributes comparable to and illustrate one possible implementation of the toll management computer 12, the image database 14, the billing database 16, the vehicle identification database 18, the highlighted vehicle identifier database 20, the billing engine 22, the image acquisition module 24, the image processing module 25, the customer management module 26, and the toll facility 28 of FIG. 1, respectively. Likewise, the vehicle 630, the party associated with the vehicle 632, and the external systems 634 typically have attributes comparable to the vehicle 30, the party associated with the vehicle 32, and the external systems 34 of FIG. 1.

The toll management computer 612 includes a toll computer message server 621 configured to communicate with the billing engine 622 and with a message server 651 of a fleet vehicle company 650 (which may be, for example, one of the external systems 634). The toll computer message server 621 also may be configured to access and update vehicle identifiers stored in the highlighted vehicle identifier database 620 and to store billing information associated with vehicles that transact with the facility 628 and that have been identified as being associated with the fleet vehicle company 650. The toll computer message server 621 and the message server 651 may be, for example, file transfer protocol (FTP) servers capable of communicating with each other across a network (not shown). The network (not shown) may be a public data network such as, for example, the Internet.

Figure 7:
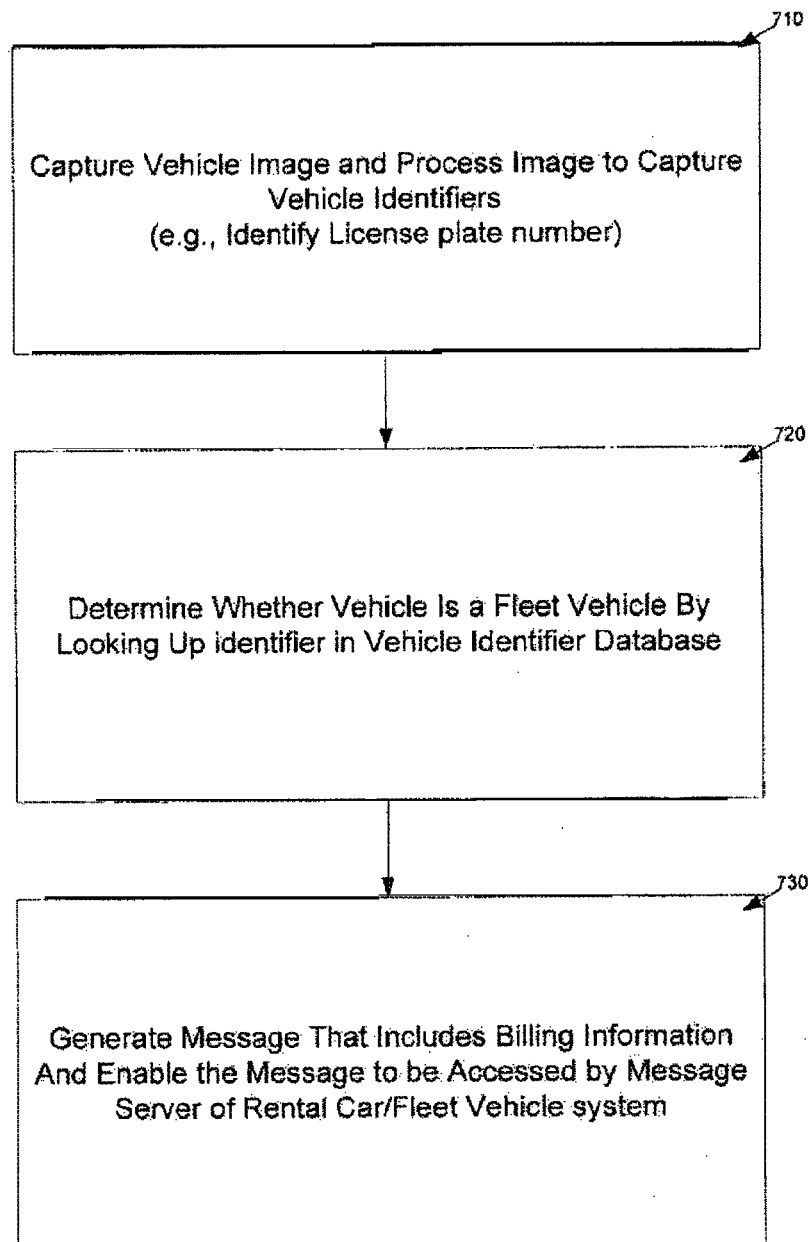
FIG. 7 is a flow chart of an implementation of an electronic toll management system related to automated handling and billing of toll information for vehicles identified as rental car/fleet vehicles.

FIG. 7 shows a general process that may be used by the toll management computer 612 for enabling automatic toll fee payment and handling for fleet vehicles. When a vehicle 630 transacts with the toll facility 628 by, for example, passing through the toll facility 628, the image acquisition module 624 captures an image and optionally other sensor data of the vehicle, as described previously (step 710). The image processing module 625 processes the image and optionally the sensor data to extract one or more vehicle identifiers 631 such as, for example, a license plate number. The toll computer 612 attempts to identify the vehicle by accessing the vehicle identifier database 618 and the highlighted vehicle identifier database 620.

If the extracted vehicle identifier(s) is, for example, listed in the highlighted vehicle identifier database 620 as being a fleet vehicle associated with the fleet vehicle company 650, the billing engine 622 generates billing information for the transacting vehicle and sends the billing information to the toll computer message server 621 for storage. (step 720) The billing information may include, for example, the fleet vehicle company identifier (e.g., HERTZ® Fairtowne-Center-Virginia and BankofAmerica®-BallstonCenter-Virginia), the vehicle identifier (e.g., license plate number and/or vehicle identification number (VIN)), the time, location, road, and lane associated with the transaction between the vehicle and the toll facility 628, and the toll fee charged for the transaction. The billing information may be generated and stored in near real-time subsequent to the vehicle 630 passing or transacting with the toll facility 628 (e.g., the billing information may be generated and stored in less than a minute after the vehicle 630 passes the toll facility 628).

The message server 651 of the fleet vehicle company 650 accesses the billing information (step 730) by communicating with the toll computer message server 621. In one implementation, the message server 651 communicates with the toll computer message server 621 to retrieve the billing information by periodically sweeping or polling the data store of the toll computer message server 621 for billing information (e.g., once every minute or once every hour). Additionally or alternatively, the message server 651 may access the billing information from the toll computer message server 621 in response to receipt of a message from the toll computer message server 621 indicating that new billing information has become available. The new billing information may be generated, stored, and/or made available in response to and, optionally, upon occurrence of the associated vehicle transacting with the toll facility 628. In yet another implementation, the toll computer message server 621 may automatically send the billing information as it is generated by the billing engine 622 to the message server 651 as part of an ftp communication or in an e-mail.

Once the billing information is received/accessed by the message server 651, the fleet vehicle company 650 may integrate the toll transaction billing data with billing data (e.g., rental car billing data, taxi fare billing data, cell phone billing data) or statement data (e.g., checking account statement data) associated with the customer's transaction with the fleet vehicle company 650. The bill payment of the customer's transaction with the toll facility is then handled by the fleet vehicle company 650 as part of its usual bill payment processing. If the fleet vehicle company is a financial services company, the toll transaction bill may be paid electronically automatically and, optionally, in near real time by debiting the customer's financial service account (e.g., checking account).

The toll system thereby allows the fleet vehicle company to be responsible for managing the billing relationship with the end customer. In some implementations, the fleet vehicle company systems include computers that electronically and automatically pay the toll services company (i.e., the company that offers the toll services through use of the toll system) upon and in response to accessing the toll services billing information. The payment may be processed and coordinated through interaction with the customer management module 626 optionally in near-real time subsequent to a toll transaction. In another implementation, the fleet vehicle company is treated in a manner similar to an individual customer and its payment may be processed manually or electronically through the previously described interactions with a payment processing module 26c.

Notably, in implementations in which the fleet vehicle company 650 has preexisting customer accounts with end users (e.g., when the fleet vehicle company 650 is a bank managing checking accounts or a cell phone company managing user cell phone accounts), the fleet vehicle company 650 acts as a value added reseller of toll accounts. Thus, in these implementations, the toll computer 612 need not manage or coordinate individual user toll accounts. Instead, the toll computer 612 leverages the existing accounts and relationships that the fleet vehicle company 650 already has with the end customer and only needs to bill the fleet vehicle company 650 for the toll fees incurred by its customers. The fleet vehicle company 650 pays the toll services for its customers and bills or debits the associated costs from the respective customer accounts.

The message server 651 also may be configured to periodically update the list of vehicle identifiers associated with the fleet vehicle company 650 that is stored in the highlighted vehicle identifier database 620. The message server 651 may update the list of vehicle identifiers, for example, at regular predetermined times (e.g., once a day), at nonpredetermined times (e.g., a vehicle is removed from service due to a vehicular accident) or in response to transactions or communications with customers of the fleet vehicle company 650 (e.g., the customer registers for automated toll payment service).

The vehicles associated with a fleet vehicle company 650 may change quite often over time as new vehicles are purchased and old vehicles are turned in or sold by the fleet vehicle company 650 or by existing customers of the fleet vehicle company that are registered for automated tolling. Thus, for proper bill handling, the message server 651 periodically instructs the message server 621 to update the list of vehicle identifiers associated with the fleet vehicle company by adding or removing specified vehicle identifiers. Depending on the vehicle turnover rate for a given company, the message server 651 may request or receive such an update periodically (e.g., once every hour, once every day, or once every month) or in response to a known vehicle change. In another implementation, the message server 651 may directly update the vehicle identifier data stored in the highlighted vehicle identifier database 620 without communicating with the toll computer message server 621.

FIG. 8 shows an exemplary checking account statement 800 for an individual user that includes entries representing automated toll payments. In particular, the checking account statement 800 reflects the account transaction history for bank account number "XXX XXX XXX 12" belonging to "John P. Smith." The statement 800 was generated by "Cyrkus Bank" and represents account activity as of Oct. 31, 2006. The checking account statement 800 may be an electronic statement, such as an online statement accessible over the Internet, that provides up-to-date account transaction history. The account statement includes a list 810 of pending transactions and a list 820 of posted transactions.

The list 810 of pending transactions shows transactions that are currently being processed by Cyrkus Bank and are awaiting approval before the transaction is allowed to debit or credit funds in the account. The list 810 includes an entry 815 illustrating an automated toll payment transaction that is pending. The entry 815 for the automated toll payment transaction indicates that a vehicle having license plate number "YVA1234" incurred a $2.65 toll at 5:35 pm while traveling on Lane 2A of the Dulles Toll Road in Dulles, Va.

Notably, the list 810 may have been updated to include the entry 815 in near real-time shortly after occurrence of the toll transaction. For example, the entry 815 may have been added to the list of pending transactions 810 by Cyrkus Bank's computers in response to communications between the message server 651 and the toll computer message server 621. For instance, the toll computer message server 621 may have generated a notification message and sent the notification message to the message server 651 at 5:37 pm, shortly after and in response to John P. Smith driving his vehicle through a facility of the Dulles Toll Road. In response to receipt of the notification message, the message server 651 may have accessed billing information from the toll computer message server 621 at 5:38 pm. Cyrkus Bank's computer systems may then have added the entry 815 reflecting the toll transaction to the list 810 at 5:40 pm. Thus, John P. Smith is able to access the account statement 800 online and see the automated toll payment transaction only minutes after having passed through the Dulles Toll Road facility.

The list 820 of posted transactions shows transactions that have resulted in funds being debited or credited to the account. The list 820 includes an entry 825 illustrating an automated toll payment transaction that was posted to the account on Oct. 24, 2006. The entry 825 for the automated toll payment transaction indicates that a vehicle having license plate number "YVA1234" incurred a $2.65 toll at $2.65 while traveling on Lane 4A of the Dulles Toll Road in Dulles, Va. The $2.65 toll payment has already been debited from the account.

In another implementation, the account statement 800 is a paper statement, rather than an electronic statement. The paper statement may be, for example, generated monthly and delivered via Snail Mail.

The above applications represent illustrative examples and the disclosed techniques disclosed can be employed in other applications. Further, the various aspects and disclosed techniques (including systems and processes) can be modified, combined in whole or in part with each other, supplemented, or deleted to produce additional implementations.

The systems and techniques described here can be implemented in digital electronic circuitry, or in computer hardware, firmware, software, or in combinations of them. The systems and techniques described here can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the systems and techniques described here can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The typical elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are within the scope of the following claims.

What is claimed is:

1. A method of toll transaction payment processing, the method comprising:

electronically storing, in a vehicle identifier data store of a toll computer system, identities of multiple registered banks, the multiple registered banks including a first bank and being banks registered for toll payment processing;

electronically receiving, by the toll computer system from a computer system of the first bank, a vehicle identifier of a vehicle of a customer of the first bank that receives a checking account service from the first bank and that has registered for an automated toll payment service offered by the first bank;

electronically storing, in the vehicle identifier data store of the toll computer system, the vehicle identifier in association with the identity of the first bank;

accessing image data for a vehicle, the image data corresponding to at least one image of the vehicle engaging in a transaction with a toll facility;

processing the image data to determine one or more vehicle identifiers for the vehicle;

electronically determining that the one or more vehicle identifiers correspond to the vehicle identifier received from the computer system of the first bank and stored in the vehicle identifier data store;

electronically identifying the first bank, from among the multiple registered banks having identities stored in the vehicle identifier data store, by accessing the identity of the first bank from the vehicle identifier data store; and electronically communicating billing information for the transaction between the vehicle and the toll facility from the toll computer system to the computer system of the first bank for debiting payment for the transaction from a checking account maintained by the first bank for the customer that registered for automated toll payment service.

2. The method of claim 1, further comprising capturing the image data.

3. The method of claim 2, wherein the capturing, accessing, processing, identifying the first bank, and communicating the billing information occur in near real-time in response to the vehicle engaging in the transaction with the toll facility.

4. The method of claim 1, further comprising receiving the payment for the transaction between the vehicle and the toll facility through the first bank.

5. The method of claim 4, wherein receiving the payment for the transaction between the vehicle and the toll facility through the first bank comprises receiving the payment from the first bank.

6. The method of claim 1, wherein the billing information does not include information associated with a vehicle transponder.

7. The method of claim 1, wherein the one or more vehicle identifiers include license plate data.

8. The method of claim 1, wherein the transaction includes at least one of a distance traveled by the vehicle through the toll facility, a time period the vehicle is present in the toll facility, the characteristic of the vehicle interacting with the toll facility, and the speed at which the vehicle passes through the toll facility.

9. The method of claim 1, wherein the facility includes at least one of a toll road, a bridge, a tunnel and a parking facility.

10. The method of claim 1,
wherein the multiple registered banks further includes a second bank, and further comprising:
electronically receiving, by the toll computer system from a computer system of the second bank, a second vehicle identifier of a vehicle of a customer of the second bank that receives a checking account service from the second bank and that has registered for an automated toll payment service offered by the second bank;
electronically storing, in the vehicle identifier data store of the toll computer system, the second vehicle identifier in association with the identity of the second bank;
accessing image data for a second vehicle, the second vehicle image data corresponding to at least one image of the second vehicle engaging in a transaction with the toll facility;
processing the second vehicle image data to determine one or more second vehicle identifiers for the second vehicle;
electronically determining that the one or more second vehicle identifiers correspond to the second vehicle identifier received from the computer system of the second bank and stored in the vehicle identifier data store;
electronically identifying the second bank, from among the multiple registered banks having identities stored in the vehicle identifier data store, by accessing the identity of the second bank from the vehicle identifier data store; and
electronically communicating billing information for the transaction between the second vehicle and the toll facility from the toll computer system to the computer system of the second bank for debiting payment for the transaction from a checking account maintained by the second bank for the customer that registered for automated toll payment service.

11. A toll system comprising:
an image data store for storing image data for vehicles, the image data corresponding to at least one image of a vehicle engaging in a transaction with a toll facility;
a vehicle identifier data store for storing vehicle identifiers and identities of multiple registered banks, the multiple registered banks including a first bank and being banks registered for toll payment processing; and
a toll computer system configured to:
store, in the vehicle identifier data store, the identities of the multiple registered banks;
receive, from a computer system of the first bank, a vehicle identifier of a vehicle of a customer of the first bank that receives a checking account service from the first bank and that has registered for an automated toll payment service offered by the first bank;
store, in the vehicle identifier data store, the vehicle identifier in association with the identity of the first bank;
access the image data for the vehicle from the image data store;
process the image data to determine one or more vehicle identifiers for the vehicle;
determine that the one or more vehicle identifiers correspond to the vehicle identifier received from the computer system of the first bank and stored in the vehicle identifier data store;
identify the first bank, from among the multiple registered banks having identities stored in the vehicle identifier data store, by accessing the identity of the first bank from the vehicle identifier data store; and
communicate billing information for the transaction between the vehicle and the toll facility to the computer system of the first bank for debiting payment for the transaction from a checking account maintained by the first bank for the customer that registered for automated toll payment service.

12. The system of claim 11, wherein the toll computer system is further configured to capture the image data.

13. The system of claim 12, wherein the toll computer system is configured to capture, access, process, identify the first bank, and communicate the billing information in near real-time in response to the vehicle engaging in the transaction with the toll facility.

14. The system of claim 11, wherein the toll computer system is further configured to receive the payment for the transaction between the vehicle and the toll facility through the first bank.

15. The system of claim 14, wherein the toll computer system being configured to receive the payment for the transaction between the vehicle and the toll facility through the first bank comprises the toll computer system being configured to receive the payment from the first bank.

16. The system of claim 11, wherein the billing information does not include information associated with a vehicle transponder.

17. The system of claim 11, wherein the one or more vehicle identifiers include license plate data.

18. The system of claim 11, wherein the transaction includes at least one of a distance traveled by the vehicle through the toll facility, a time period the vehicle is present in the toll facility, the characteristic of the vehicle interacting with the toll facility, and the speed at which the vehicle passes through the toll facility.

19. The system of claim 1, wherein the facility includes at least one of a toll road, a bridge, a tunnel and a parking facility.

20. The system of claim 11,
wherein the multiple registered banks further includes a second bank,
wherein the toll system is further configured to:

electronically receive, from a computer system of the second bank, a second vehicle identifier of a vehicle of a customer of the second bank that receives a checking account service from the second bank and that has registered for an automated toll payment service offered by the second bank;

electronically store, in the vehicle identifier data store, the second vehicle identifier in association with the identity of the second bank;

access image data for a second vehicle from the image data store, the second vehicle image data corresponding to at least one image of the second vehicle engaging in a transaction with the toll facility;

process the second vehicle image data to determine one or more second vehicle identifiers for the second vehicle;

determine that the one or more second vehicle identifiers correspond to the second vehicle identifier received from the computer system of the second bank and stored in the vehicle identifier data store;

identify the second bank, from among the multiple registered banks having identities stored in the vehicle identifier data store, by accessing the identity of the second bank from the vehicle identifier data store; and communicate billing information for the transaction between the second vehicle and the toll facility to the computer system of the second bank for debiting payment for the transaction from a checking account maintained by the second bank for the customer that registered for automated toll payment service.

\* \* \* \* \*